US011778322B2

(12) United States Patent
Chen et al.

(10) Patent No.: US 11,778,322 B2
(45) Date of Patent: Oct. 3, 2023

(54) METHOD AND APPARATUS FOR PERFORMING ELECTRONIC IMAGE STABILIZATION WITH DYNAMIC MARGIN

(71) Applicant: MEDIATEK INC., Hsin-Chu (TW)

(72) Inventors: Hsiao-Wei Chen, Hsinchu (TW); Meng-Hung Cho, Hsinchu (TW); Yu-Chun Chen, Hsinchu (TW); Shu-Fan Wang, Hsinchu (TW); Te-Hao Chang, Hsinchu (TW); Ying-Jui Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 183 days.

(21) Appl. No.: 17/392,284

(22) Filed: Aug. 3, 2021

(65) Prior Publication Data

US 2022/0053134 A1    Feb. 17, 2022

Related U.S. Application Data

(60) Provisional application No. 63/066,364, filed on Aug. 17, 2020.

(51) Int. Cl.
*H04N 23/68* (2023.01)
(52) U.S. Cl.
CPC ....... *H04N 23/6845* (2023.01); *H04N 23/681* (2023.01)

(58) Field of Classification Search
CPC ............ H04N 23/6845; H04N 23/681; H04N 23/683; H04N 23/6811
USPC ...................................... 348/208.4
See application file for complete search history.

(56) References Cited

U.S. PATENT DOCUMENTS

| 2011/0243532 | A1* | 10/2011 | Bostaph | H04N 23/6812 386/278 |
| 2015/0022677 | A1* | 1/2015 | Guo | H04N 23/6811 348/208.1 |
| 2017/0041545 | A1 | 2/2017 | Murgia | |
| 2020/0382725 | A1* | 12/2020 | Gao | H04N 23/61 |

* cited by examiner

*Primary Examiner* — Usman A Khan
(74) *Attorney, Agent, or Firm* — Winston Hsu

(57) ABSTRACT

An electronic image stabilization (EIS) method includes: obtaining video frames derived from an output of an image sensor, wherein each of the video frames has a full field of view (FOV) of the image sensor; obtaining motion information of the video frames; dynamically estimating, by a processing circuit, EIS margins according to FOV variation of a plurality of cropped images within the video frames respectively; and applying stabilization correction to the cropped images according to the motion information and the EIS margins, to generate a plurality of stabilized images.

15 Claims, 5 Drawing Sheets

METHOD AND APPARATUS FOR PERFORMING ELECTRONIC IMAGE STABILIZATION WITH DYNAMIC MARGIN

CROSS REFERENCE TO RELATED APPLICATIONS

This application claims the benefit of U.S. provisional application No. 63/066,364, filed on Aug. 17, 2020 and incorporated herein by reference.

BACKGROUND

The present invention relates to an electronic image stabilization technique, and more particularly, to a method and apparatus for performing electronic image stabilization with dynamic margin.

Electronic image stabilization (EIS) is an image enhancement technique using electronic processing. Generally speaking, EIS can minimize blurring and compensates for device shake, often a camera shake. For example, a video frame processed by EIS is divided into a cropped image with a desired field of view (FOV) and an EIS margin outside the cropped image, where a stabilized image is derived from applying stabilization correction to the cropped image, and the EIS margin is used by stabilization correction to compensate for camera movements. Specifically, the video frame would lose some FOV for obtaining the stabilized image, and the lost FOV is called EIS margin. In various scenarios, a typical EIS design employs a fixed/pre-defined EIS margin (e.g. an EIS margin encompassing a fixed/pre-defined percentage of pixels in a horizontal direction and a fixed/pre-defined percentage of pixels in a vertical direction) regardless of FOV variation. As a result, when an output video FOV is small under a specific scenario such as a digital zoom scenario, the typical EIS design has degraded EIS quality due to using a fixed/pre-defined EIS margin.

SUMMARY

One of the objectives of the claimed invention is to provide a method and apparatus for performing electronic image stabilization with dynamic margin.

According to a first aspect of the present invention, an exemplary electronic image stabilization (EIS) method is disclosed. The exemplary EIS method includes: obtaining a plurality of video frames derived from an output of an image sensor, wherein each of the plurality of video frames has a full field of view (FOV) of the image sensor; obtaining motion information of the plurality of video frames; dynamically estimating, by a processing circuit, EIS margins according to FOV variation of a plurality of cropped images that are within the plurality of video frames respectively; and applying stabilization correction to the plurality of cropped images according to the motion information and the EIS margins, to generate a plurality of stabilized images.

According to a second aspect of the present invention, an exemplary electronic image stabilization (EIS) apparatus is disclosed. The exemplary EIS apparatus includes a storage device and a processing circuit. The storage device is arranged to buffer a plurality of video frames derived from an output of an image sensor, wherein each of the plurality of video frames has a full field of view (FOV) of the image sensor. The processing circuit is arranged to obtain motion information of the plurality of video frames, dynamically estimate EIS margins according to FOV variation of a plurality of cropped images that are within the plurality of video frames respectively, and apply stabilization correction to the plurality of cropped images according to the motion information and the EIS margins, to generate a plurality of stabilized images.

According to a third aspect of the present invention, an exemplary non-transitory machine-readable medium for storing a program code is disclosed. When loaded and executed by a processing circuit, the program code instructs the processing circuit to perform following steps: obtaining a plurality of video frames derived from an output of an image sensor, wherein each of the plurality of video frames has a full field of view (FOV) of the image sensor; obtaining motion information of the plurality of video frames; dynamically estimating EIS margins according to FOV variation of a plurality of cropped images that are within the plurality of video frames respectively; and applying stabilization correction to the plurality of cropped images according to the motion information and the EIS margins, to generate a plurality of stabilized images.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
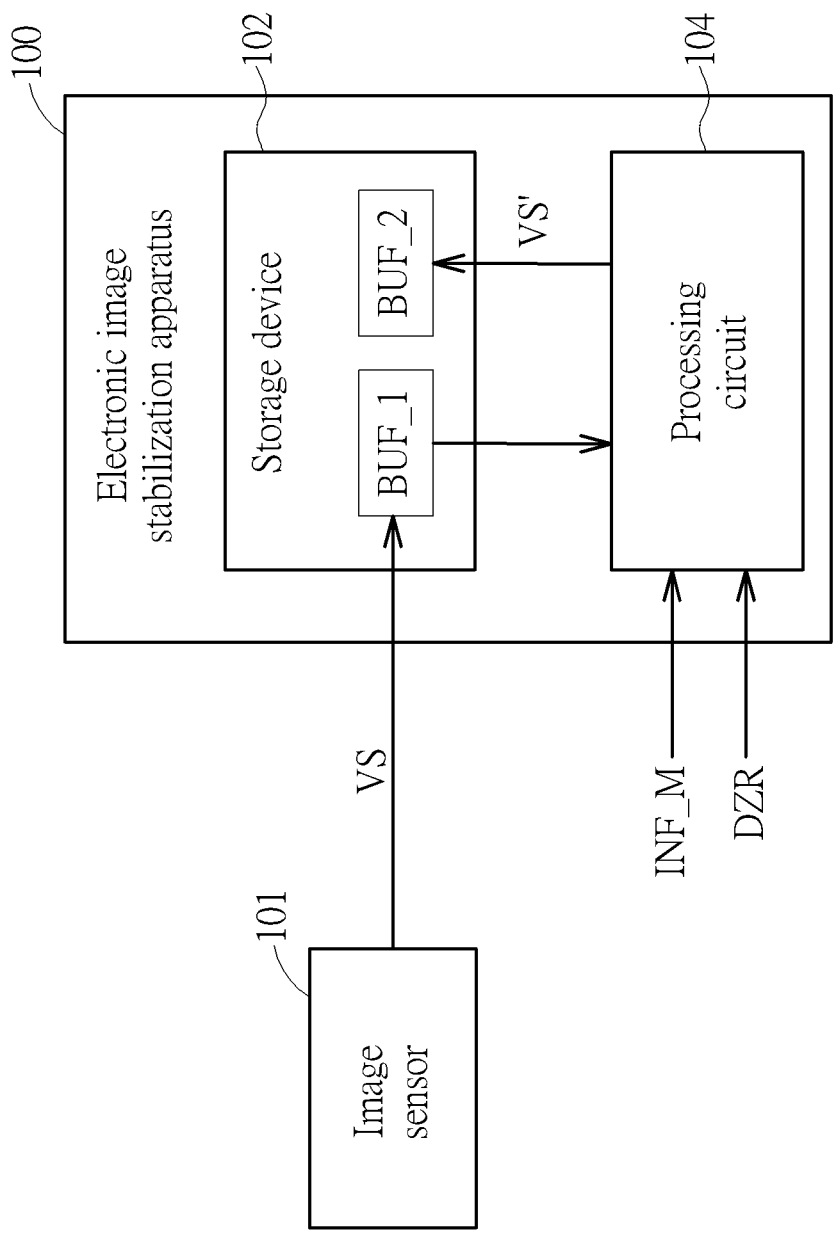
FIG. 1 is a diagram illustrating an electronic image stabilization (EIS) apparatus according to an embodiment of the present invention.

FIG. 1 is a diagram illustrating an electronic image stabilization (EIS) apparatus according to an embodiment of the present invention. The EIS apparatus 100 may be a part of an electronic device with a camera module, where the camera module may include an image sensor 101. For example, the EIS apparatus 100 may be used by a mobile phone, a tablet, or a digital video recorder. The EIS apparatus 100 may include a storage device 102 and a processing circuit 104. The storage device 102 may be implemented by one or more volatile memories, one or more non-volatile memories, or any component (s) with storage capability. In this embodiment, an input buffer BUF_1 and an output buffer BUF_2 are allocated in the storage device 102. The EIS apparatus 100 is arranged to stabilize a video sequence VS. The video frames of the video sequence VS may be buffered in the input buffer BUF_1. The processing circuit 104 may be a dedicated circuit designed to perform an EIS algorithm upon the video frames buffered in the input buffer BUF_1 to generate a video sequence VS' including stabilized images. The stabilized images of the video sequence VS' may be stored in the output buffer BUF_2. In this embodiment, electronic image stabilization with dynamic margin is employed by the processing circuit 104. Further details of the proposed electronic image stabilization with dynamic margin are described as below.

Figure 2:
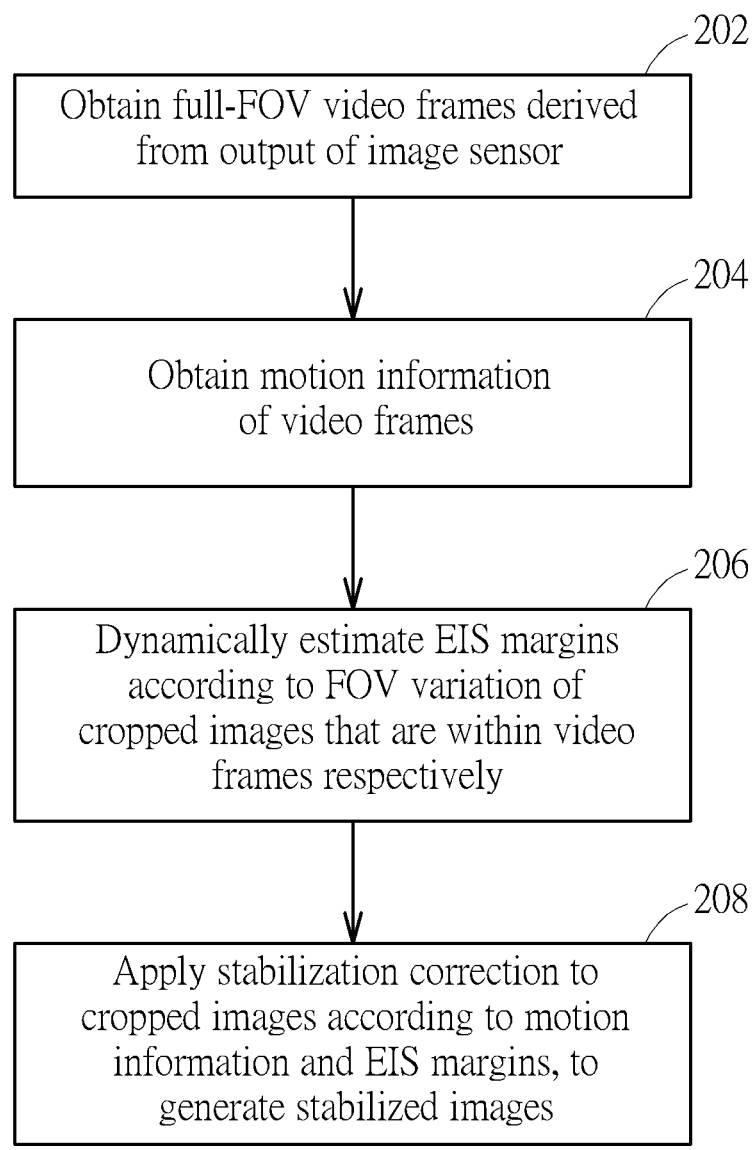
FIG. 2 is a flowchart illustrating an electronic image stabilization (EIS) method according to an embodiment of the present invention.

Please refer to FIG. 1 in conjunction with FIG. 2. FIG. 2 is a flowchart illustrating an electronic image stabilization (EIS) method according to an embodiment of the present invention. The EIS method may be employed by the EIS apparatus 100. Provided that the result is substantially the same, the steps are not required to be executed in the exact order shown in FIG. 2. At step 202, the EIS apparatus 100 obtains the video sequence VS that includes a plurality of video frames derived from an output of the image sensor 101, and buffers the video frames in the input buffer BUF_1, wherein each of the video frames has a full field of view (FOV) of the image sensor 101. For example, each full-FOV video frame fed into the EIS apparatus 100 has a resolution that is the same as that of the image sensor 101. In other words, all full-FOV video frames fed into the EIS apparatus 100 have the same number of pixels. In some embodiments, the output of the image sensor 101 may be received by the EIS apparatus 100 after undergoing certain processing in an image signal processor (ISP). However, this is not meant to be a limitation of the present invention.

At step 204, the processing circuit 104 obtains motion information INF_M of video frames included in the video sequence VS. For example, the motion information INF_M includes motion data of each video frame, where the motion data of each video frame is indicative of camera motion that occurs at the time the video frame is captured by the image sensor 101. For example, the motion data of each video frame may be directly provided from a motion sensor such as a gyro sensor. For another example, the motion data of each video frame may be obtained by estimating a motion vector between a pair of images. To put it simply, the present invention has no limitations on the means of obtaining the motion information INF_M.

At step 206, the processing circuit 104 dynamically estimates EIS margins according to FOV variation of a plurality of cropped images within the video frames. Each of the video frame is divided into a cropped image with a desired FOV and an EIS margin outside the cropped image, wherein the EIS margin is used by stabilization correction to compensate for camera movements. In contract to the typical EIS design which uses a fixed/pre-defined EIS margin (e.g., an EIS margin encompassing a fixed/pre-defined percentage of pixels in a vertical direction and a fixed/pre-defined percentage of pixels in a horizontal direction) regardless of FOV variation, the EIS design proposed by the present invention uses a dynamic EIS margin which is estimated from the FOV control.

Figure 3:
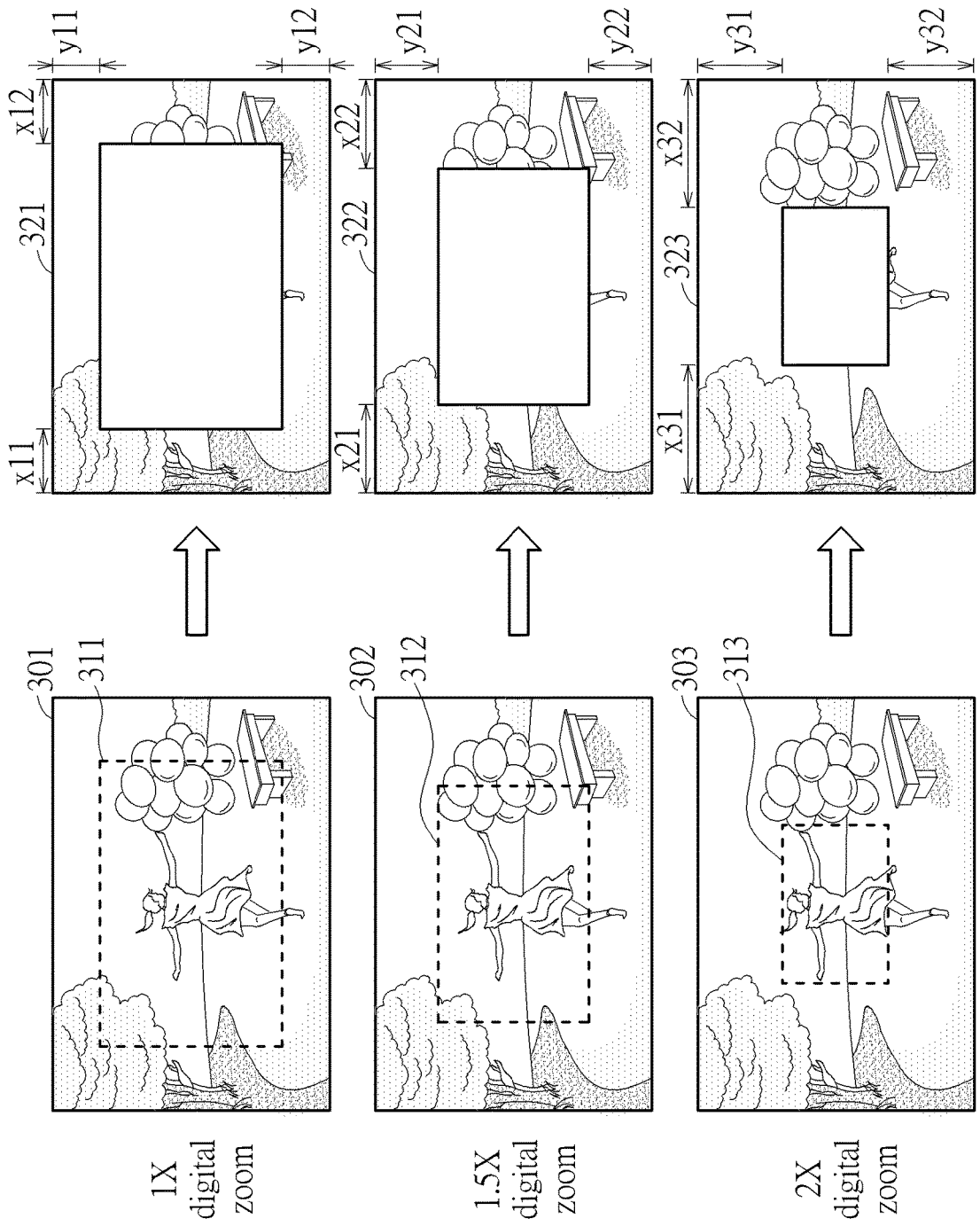
FIG. 3 is a diagram illustrating dynamic EIS margin estimation based on field of view (FOV) change according to an embodiment of the present invention.

FIG. 3 is a diagram illustrating dynamic EIS margin estimation based on FOV change according to an embodiment of the present invention. The video sequence VS may include successive video frames 301, 302, 303. In this embodiment, an output video FOV is adjusted by a digital zoom ratio DZR selected by a user input. In other words, a change of the digital zoom ratio DZR leads to an FOV change. In accordance with the digital zoom ratio DZR, the EIS algorithm employed by the processing circuit 504 determines an FOV of a cropped image and an EIS margin. As shown in FIG. 3, when the digital zoom ratio DZR is set by 1×, a default FOV may be employed to select a cropped image 311 from the full-FOV video frame 301 whose resolution is the same as that of the image sensor 101, and a default EIS margin 321 encompassing a default percentage of pixels in a horizontal direction and a default percentage of pixels in a vertical direction may be estimated. For example, the default EIS margin 321 is defined by (x11+x12) pixels in the horizontal direction and (y11+y12) pixels in the vertical direction. Pixels included in the default EIS margin 321 can be used to compensate for camera motions, such that the area of the cropped image 311 is allowed to be shifted horizontally and/or vertically by the stabilization correction.

As shown in FIG. 3, when the digital zoom ratio DZR is set by 1.5×, a narrower FOV may be employed to select a cropped image 312 from the full-FOV video frame 302 whose resolution is the same as that of the image sensor 101 (i.e. full-FOV video frames 301 and 302 have the same resolution without cropping), and a dynamic EIS margin 322 encompassing a larger percentage of pixels in a horizontal direction and a larger percentage of pixels in a vertical direction may be estimated. For example, the dynamic EIS margin 322 is different from the default EIS margin 321, and is defined by (x21+x22) pixels in the horizontal direction and (y21+y22) pixels in the vertical direction, where (x21+x22)>(x11+x12) and (y21+y22)>(y11+y12). Pixels included in the dynamic EIS margin 322 can be used to compensate for camera motions, such that the area of the cropped image 312 is allowed to be shifted horizontally and/or vertically by the stabilization correction.

As shown in FIG. 3, when the digital zoom ratio DZR is set by 2×, a much narrower FOV may be employed to select a cropped image 313 from the full-FOV video frame 303 whose resolution is the same as that of the image sensor 101 (i.e. full-FOV video frames 301, 302, 303 have the same resolution without cropping), and a dynamic EIS margin 323 encompassing a much larger percentage of pixels in a horizontal direction and a much larger percentage of pixels in a vertical direction may be estimated. For example, the dynamic EIS margin 323 is different from the default EIS margin 321 and the dynamic EIS margin 322, and is defined by (x31+x32) pixels in the horizontal direction and (y31+y32) pixels in the vertical direction, where (x31+x32)>(x21+x22) and (y31+y32)>(y21+y22). Pixels included in the dynamic EIS margin 323 can be used to compensate for camera motions, such that the area of the cropped image 313 is allowed to be shifted horizontally and/or vertically by the stabilization correction.

When the output video FOV is reduced due to a digital zoom ratio larger than 1×, the full-FOV video frame is not cropped by the digital zoom algorithm before the EIS algorithm estimates the EIS margin. In other words, when the output video FOV is reduced due to a digital zoom ratio larger than 1×, the full-FOV video frame is used by the EIS algorithm to estimate the EIS margin. In this way, the EIS algorithm employed by the processing circuit 504 enables dynamic EIS margin estimation for deciding a larger EIS margin that can be used by following stabilization correction, thereby achieving better EIS quality.

At step 208, the processing circuit 104 applies stabilization correction to a plurality of cropped images, each being within one of the video frames in the video sequence VS, according to the motion information INF_M and the EIS margins, to generate a plurality of stabilized images. With the integration of dynamic margin, a stable video sequence VS' with better EIS quality can be generated by stabilizing the source video sequence VS according to the camera motion information.

Figure 4:
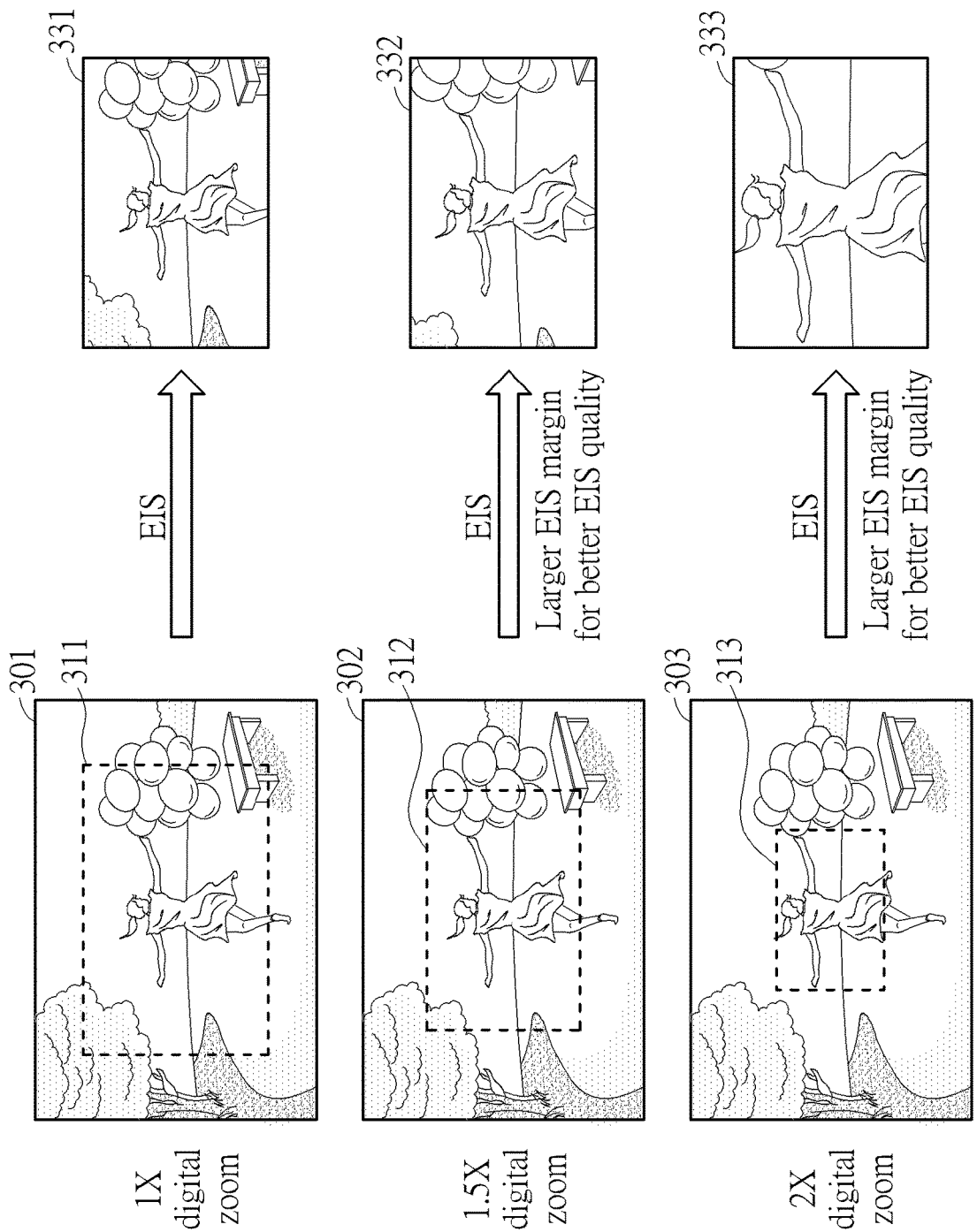
FIG. 4 is a diagram illustrating a stable video sequence generated by stabilization correction based on motion information and EIS margin according to an embodiment of the present invention.

Please refer to FIG. 3 in conjunction with FIG. 4. FIG. 4 is a diagram illustrating a stable video sequence generated by stabilization correction based on motion information and EIS margin according to an embodiment of the present invention. As shown in FIG. 4, when the digital zoom ratio DZR is set by 1×, the EIS algorithm employed by the processing circuit 104 applies stabilization correction to the cropped image 311 according to motion data of the video frame 301 and the EIS margin 321 estimated from the video frame 301, and generates a stabilized image 331 from the cropped image 311. Since the digital zoom ratio DZR is set by 1×, no resizing is applied to the cropped image 311, such that the stabilized image 331 is a part of the video frame 301 and extracted from the video frame 301 by the EIS algorithm employed by the processing circuit 104. When the digital zoom ratio DZR is set by 1.5×, the EIS algorithm employed by the processing circuit 104 applies stabilization correction to the cropped image 312 according to motion data of the video frame 302 and the EIS margin 322 estimated from the video frame 302, and generates a stabilized image 332 from the cropped image 312, where an FOV of the cropped image 312 is smaller than an FOV of the cropped image 311. Since the digital zoom ratio DZR is set by 1.5×, the EIS algorithm employed by the processing circuit 104 further resizes (upscales) the cropped image 312 to set the stabilized image 332 having a resolution the same as that of the stabilized image 331. When the digital zoom ratio DZR is set by 2×, the EIS algorithm employed by the processing circuit 104 applies stabilization correction to the cropped image 313 according to motion data of the video frame 303 and the EIS margin 323 estimated from the video frame 303, and generates a stabilized image 333 from the cropped image 313, where an FOV of the cropped image 313 is smaller than an FOV of the cropped image 312. Since the digital zoom ratio DZR is set by 2×, the EIS algorithm employed by the processing circuit 104 further resizes (upscales) the cropped image 313 to set the stabilized image 333 having a resolution the same as that of the stabilized image 331.

In the aforementioned embodiment, the proposed electronic image stabilization with dynamic margin is implemented using hardware only, that is, the processing circuit 104 may be a dedicated hardware circuit. However, this is for illustrative purposes only, and is not meant to be a limitation of the present invention. Alternatively, the proposed electronic image stabilization with dynamic margin may be implemented in a software-based fashion.

Figure 5:
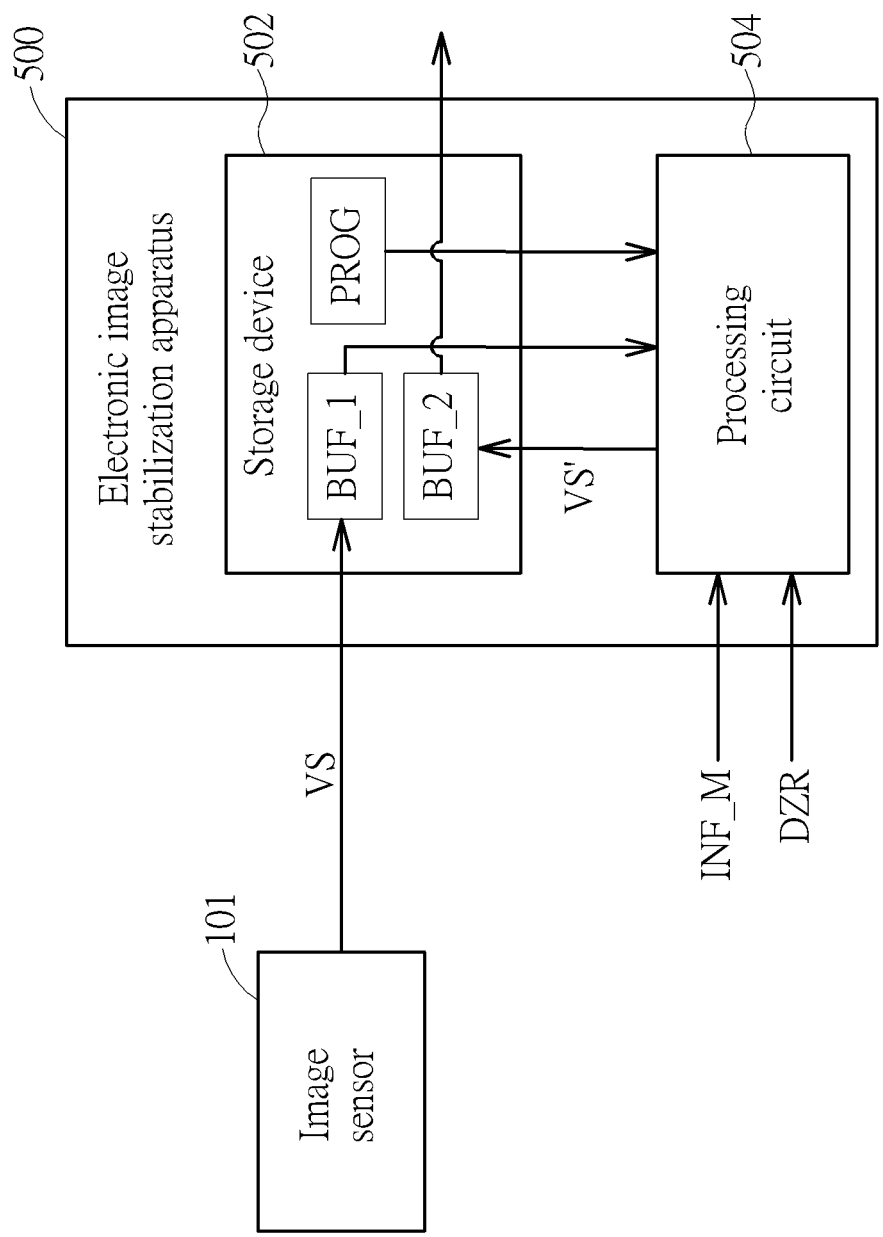
FIG. 5 is a diagram illustrating another electronic image stabilization (EIS) apparatus according to an embodiment of the present invention.

FIG. 5 is a diagram illustrating another electronic image stabilization (EIS) apparatus according to an embodiment of the present invention. The EIS apparatus 500 includes a storage device 502 and a processing circuit 504. In this embodiment, the processing circuit 504 may be implemented by a processor, a microcontroller unit, or any element with the software execution capability; and the storage device 502 is a machine-readable medium, and may be implemented by one or more volatile memories, one or more non-volatile memories, or any element (s) with the storage capability. The major difference between the EIS apparatuses 100 and 500 is that the processing circuit 504 of the EIS apparatus 500 is capable of achieving designated functions by software execution. As shown in FIG. 5, a program code PROG is stored in the storage device 504. In addition, the aforementioned input buffer BUF_1 and output buffer BUF_2 are also allocated in the storage device 502, but the present invention is not limited thereto. When the program code PROG is loaded and executed by the processing circuit 504, the program code PROG instructs the processing circuit 504 to perform the proposed electronic image stabilization with dynamic margin. For example, steps of the proposed electronic image stabilization method shown in FIG. 2 may be performed by the program code PROG running on the processing circuit 504. As a person skilled in the art can readily understand details of the EIS apparatus 500 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic image stabilization (EIS) method comprising:

obtaining a plurality of video frames derived from an output of an image sensor, wherein each of the plurality of video frames has a full field of view (FOV) of the image sensor;

obtaining motion information of the plurality of video frames;

dynamically estimating, by a processing circuit, EIS margins according to FOV variation of a plurality of cropped images that are within the plurality of video frames respectively; and applying stabilization correction to the plurality of cropped images according to the motion information and the EIS margins, to generate a plurality of stabilized images;

wherein one of the plurality of video frames includes one of the plurality of cropped images and one of the EIS margins; within said one of the plurality of video frames, said one of the EIS margins is outside said one of the plurality of cropped images; and said one of the EIS margins is used by the stabilization correction applied to said one of the plurality of cropped images; and wherein the plurality of cropped images comprise cropped images with different FOVs, and the EIS margins that are dynamically estimated according to the FOV variation of the plurality of cropped images comprise EIS margins with different sizes for the cropped images with different FOVs.

2. The EIS method of claim 1, wherein the plurality of video frames comprise a first video frame and a second image, the plurality of cropped images comprise a first cropped image within the first video frame and a second cropped image within the second video frame, an FOV of the second cropped image is different from an FOV of the first cropped image, and an EIS margin within the first video frame is different from an EIS margin within the second video frame.

3. The EIS method of claim 2, wherein the FOV of the second cropped image is smaller than the FOV of the first cropped image, and the EIS margin within the first video frame is larger than the EIS margin within the second video frame.

4. The EIS method of claim 2, wherein the FOV of the second cropped image is set in response to a first digital zoom ratio, and the FOV of the first cropped image is set in response to a second digital zoom ratio different from the first digital zoom ratio.

5. The EIS method of claim 4, wherein the second digital zoom ratio is larger than the first digital zoom ratio, and the EIS margin within the first video frame is larger than the EIS margin within the second video frame.

6. An electronic image stabilization (EIS) apparatus comprising:
a storage device, arranged to buffer a plurality of video frames derived from an output of an image sensor, wherein each of the plurality of video frames has a full field of view (FOV) of the image sensor; and
a processing circuit, arranged to obtain motion information of the plurality of video frames, dynamically estimate EIS margins according to FOV variation of a plurality of cropped images that are within the plurality of video frames respectively, and apply stabilization correction to the plurality of cropped images according to the motion information and the EIS margins, to generate a plurality of stabilized images;
wherein one of the plurality of video frames includes one of the plurality of cropped images and one of the EIS margins; within said one of the plurality of video frames, said one of the EIS margins is outside said one of the plurality of cropped images; and said one of the EIS margins is used by the stabilization correction applied to said one of the plurality of cropped images; and
wherein the plurality of cropped images comprise cropped images with different FOVs, and the EIS margins that are dynamically estimated according to the FOV variation of the plurality of cropped images comprise EIS margins with different sizes for the cropped images with different FOVs.

7. The EIS apparatus of claim 6, wherein the plurality of video frames comprise a first video frame and a second image, the plurality of cropped images comprise a first cropped image within the first video frame and a second cropped image within the second video frame, an FOV of the second cropped image is different from an FOV of the first cropped image, and an EIS margin within the first video frame is different from an EIS margin within the second video frame.

8. The EIS apparatus of claim 7, wherein the FOV of the second cropped image is smaller than the FOV of the first cropped image, and the EIS margin within the first video frame is larger than the EIS margin within the second video frame.

9. The EIS apparatus of claim 7, wherein the processing circuit sets the FOV of the second cropped image in response to a first digital zoom ratio, and sets the FOV of the first cropped image in response to a second digital zoom ratio different from the first digital zoom ratio.

10. The EIS apparatus of claim 9, wherein the second digital zoom ratio is larger than the first digital zoom ratio, and the EIS margin within the first video frame is larger than the EIS margin within the second video frame.

11. A non-transitory machine-readable medium for storing a program code, wherein when loaded and executed by a processing circuit, the program code instructs the processing circuit to perform following steps:
obtaining a plurality of video frames derived from an output of an image sensor, wherein each of the plurality of video frames has a full field of view (FOV) of the image sensor;
obtaining motion information of the plurality of video frames;
dynamically estimating EIS margins according to FOV variation of a plurality of cropped images that are within the plurality of video frames respectively; and
applying stabilization correction to the plurality of cropped images according to the motion information and the EIS margins, to generate a plurality of stabilized images;
wherein one of the plurality of video frames includes one of the plurality of cropped images and one of the EIS margins; within said one of the plurality of video frames, said one of the EIS margins is outside said one of the plurality of cropped images; and said one of the EIS margins is used by the stabilization correction applied to said one of the plurality of cropped images; and
wherein the plurality of cropped images comprise cropped images with different FOVs, and the EIS margins that are dynamically estimated according to the FOV variation of the plurality of cropped images comprise EIS margins with different sizes for the cropped images with different FOVs.

12. The non-transitory machine-readable medium of claim 11, wherein the plurality of video frames comprise a first video frame and a second image, the plurality of cropped images comprise a first cropped image within the first video frame and a second cropped image within the second video frame, an FOV of the second cropped image is different from an FOV of the first cropped image, and an EIS margin within the first video frame is different from an EIS margin within the second video frame.

13. The non-transitory machine-readable medium of claim 12, wherein the FOV of the second cropped image is smaller than the FOV of the first cropped image, and the EIS margin within the first video frame is larger than the EIS margin within the second video frame.

14. The non-transitory machine-readable medium of claim 12, wherein the FOV of the second cropped image is set in response to a first digital zoom ratio, and the FOV of the first cropped image is set in response to a second digital zoom ratio different from the first digital zoom ratio.

15. The non-transitory machine-readable medium of claim 14, wherein the second digital zoom ratio is larger than the first digital zoom ratio, and the EIS margin within the first video frame is larger than the EIS margin within the second video frame.

* * * * *